(12) United States Patent
Minge et al.

(10) Patent No.: US 7,998,583 B2
(45) Date of Patent: Aug. 16, 2011

(54) NANOPARTICULATE SILICONE ORGANO COPOLYMERS AND USE THEREOF IN COATING COMPOSITIONS

(75) Inventors: Oliver Minge, Munich (DE); Albert Hausberger, Kienberg (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/936,751

(22) PCT Filed: Jun. 10, 2009

(86) PCT No.: PCT/EP2009/057137
§ 371 (c)(1),
(2), (4) Date: Oct. 7, 2010

(87) PCT Pub. No.: WO2009/153195
PCT Pub. Date: Dec. 23, 2009

(65) Prior Publication Data
US 2011/0046294 A1    Feb. 24, 2011

(30) Foreign Application Priority Data

Jun. 20, 2008   (DE) .......................... 10 2008 002 570

(51) Int. Cl.
*C08F 230/08* (2006.01)
(52) U.S. Cl. ......... 428/405; 428/407; 526/279; 523/209
(58) Field of Classification Search .................. 428/405, 428/407; 526/279; 523/209
See application file for complete search history.

(56) References Cited

U.S. PATENT DOCUMENTS

| | | | |
|---|---|---|---|
| 2,916,461 A | 12/1959 | Krantz | |
| 5,188,899 A | 2/1993 | Matsumoto | |
| 5,750,258 A * | 5/1998 | Sakai et al. | 428/405 |
| 6,869,643 B1 | 3/2005 | Mayer | |
| 7,674,868 B2 * | 3/2010 | Minge et al. | 526/279 |
| 2006/0116495 A1 | 6/2006 | Stark | |
| 2008/0146743 A1 | 6/2008 | Minge | |
| 2010/0069551 A1 | 3/2010 | Minge | |

FOREIGN PATENT DOCUMENTS

| | | |
|---|---|---|
| DE | 1076946 A | 3/1960 |
| DE | 10301976 A1 | 7/2004 |
| DE | 102005000824 A1 | 7/2006 |
| DE | 102006054158 A1 | 5/2008 |
| EP | 0791566 A1 | 8/1997 |
| EP | 1833867 B1 | 8/2008 |

OTHER PUBLICATIONS

Fox T. G., Bull. Am. Physics Soc. 1, 3, p. 123 (1956).
Landfester, Polyreactions in Miniemulsions, Macromol. Rapid. Commun. 2001,22, 896-936.
M.S. El-Aasser, E. D. Sudol, Miniemulsions: Overview of Research and Applications, 2004, JCT Research, 1, 20-31.

* cited by examiner

*Primary Examiner* — Margaret G Moore
(74) *Attorney, Agent, or Firm* — Brooks Kushman P.C.

(57) ABSTRACT

Nanoparticulate silicone organo copolymers exhibit controlled hydrophobicity in composite thermal insulation systems.

14 Claims, No Drawings

NANOPARTICULATE SILICONE ORGANO COPOLYMERS AND USE THEREOF IN COATING COMPOSITIONS

CROSS-REFERENCE TO RELATED APPLICATION

This application is the U.S. national phase of PCT Appln. No. PCT/EP2009/057137 filed Jun. 10, 2009 which claims priority to German application DE 10 2008 002 570.4 filed Jun. 20, 2008.

BACKGROUND OF THE INVENTION

1. Field of the Invention

The invention relates to nanoparticulate silicone organocopolymers in the form of their aqueous dispersions or water-redispersible powders, to processes for preparing them, and to their use in coating compositions, more particularly for producing thermal insulation composite systems.

2. Description of the Related Art

Thermal insulation composite systems (TICS) are very important in the insulation of buildings, especially external walls of buildings. TICS typically comprise insulating material, plaster layers, and a coating of a coating composition, such as a paint coat, for example. Common insulating materials are glass wool or boards based on polystyrene. Examples of TICS substrates are brick, lime sandstone or concrete. Plaster layers, based typically on mortar, may be applied to the insulating material. As a further layer, generally the uppermost layer, the TICS comprises a coating of a coating composition. The entire system made up of building surface and TICS is also referred to as an exterior insulation and finishing system (EIFS). TICS reduce the loss of heat from buildings. The insulant properties of TICS derive essentially from the presence within the TICS of at least one component having poor thermal conductivity, such as, for example, components which include air pores.

A widespread occurrence in TICS is damage due to condensation. Condensation may occur in the TICS when the TICS is cooled to such an extent by the ambient air that the temperature reaches or falls below the dew point of the air present, for example, within the air pores of the TICS, and, consequently, water condenses out. The occurrence of condensation causes problems particularly in cold seasons, when the heat introduced into the TICS by insulation, for example, is no longer sufficient to evaporate the condensation formed in the TICS and ultimately to release it from the TICS.

The condensation leads to weathering of the TICS, such as, for example, to the insulant becoming wet through, to algal infestation or to delamination of components of the TICS as a result of freezing condensation, and so the thermal insulation capacity of the TICS is restricted and, ultimately, it is damaged to such an extent that it must be renovated or renewed completely.

It is therefore important to design the TICS in such a way as to prevent accumulation of condensation in the TICS or penetration of water from the environment into the TICS.

In order to prevent penetration of water into exterior facades or TICS, coating compositions have to date been modified frequently with organosilicone compounds as a hydrophobicizing additive. For instance, EP-A 0791566 recommends coating compositions based on alkoxysilanes and optionally alkoxy-functional organopolysiloxanes for hydrophobicizing mineral building materials. DE-A 1076946 teaches the use of organopolysiloxanes based on alkylalkoxysilanes and ethylene glycol as additives for hydrophobicizing porous building materials. Other examples are silicone resin paints or silicone-modified silicate paints or emulsion paints. The application of coating compositions with these kinds of modifications results in coated building materials whose surface and also whose capillaries connected to the surface are hydrophobicized. TICS produced accordingly, therefore, have surface hydrophobicity and capillary hydrophobicity, with the result that condensation arising in the form of water vapor in the TICS, for example, is repelled by the hydrophobicized coating and accumulates in the form of water droplets in the TICS. In comparison to thin films of water, water droplets have a low surface area and so evaporate more slowly.

Furthermore, coatings with capillary hydrophobicity generate a high diffusion resistance for water vapor, and so the liberation of condensation from corresponding hydrophobicized TICS is made more difficult. In contrast, in the case of TICS, it would be advantageous for the diffusion resistance for water vapor to decrease toward the air side of the TICS, in order to facilitate the escape of water vapor from the TICS.

EP-A 1833867 describes, for example, the use of copolymers based on ethylenically unsaturated monomers and ethylenically functionalized nanoparticles as coating compositions for building materials. The coatings obtainable therewith, however, are still not sufficiently wettable with water. Moreover, the copolymers described therein are not highly transparent, high transparency in many fields of application constituting an important requirement of coating compositions.

SUMMARY OF THE INVENTION

Against this background, an object was to provide transparent polymers whose use in coating compositions opens up access to coatings whose hydrophobicity is such as to prevent penetration of water into the coatings, and whose hydrophilicity at the same time is such that the coatings are wettable by water. These and other objects are surprisingly achieved by use of nanoparticulate silicone organocopolymers which comprise units of linear polydiorganosiloxanes, it then being possible to provide coating compositions which simultaneously combine the opposing properties of hydrophilicity and hydrophobicity in a manner needed in order to achieve the objects of the invention.

DETAILED DESCRIPTION OF THE PREFERRED EMBODIMENTS

The invention thus provides nanoparticulate silicone organocopolymers in the form of their aqueous polymer dispersions or water-redispersible polymer powders, obtainable by means of free-radical initiated polymerization in an aqueous medium and, if desired, subsequent drying of the resultant polymer dispersion, of A) one or more monomers from the group consisting of vinyl esters, (meth)acrylic esters, vinylaromatics, olefins, 1,3-dienes, vinyl ethers and vinyl halides and, if desired, further monomers copolymerizable therewith, in the presence of B) at least one particle P having an average diameter of $\leqq 1000$ nm, which is functionalized with ethylenically unsaturated, free-radically polymerizable groups, where B1) the particles P are one or more particles from the group of metal oxides and semimetal oxides, and/or B2) the particles P are silicone resins of the general formula $[R^4{}_{(p+z)}SiO_{(4-p-z)/2}]_m$ (II), the individual radicals $R^4$ each independently of one another being hydrogen, hydroxyl, and also alkyl, cycloalkyl, aryl, alkoxy or aryloxy radicals having in each case up to 18 C atoms, which may optionally be substituted, m being an integral number $\geq 30$, and where, for at least 20 mol % of the respective silicone resin, p+z=0, 1 or 3, characterized in that C) one or more linear polydiorganosiloxanes of the general formula $R^9_3SiO—[R^8_2SiO_{2/2}]_n—SiR^9_3$ (III) are copolymerized, where the individual radicals $R^8$ and $R^9$ each independently of one another are hydroxyl, alkyl, cycloalkyl, aryl, alkoxy or aryloxy radicals having in each case up to 18 C atoms, which may optionally be substituted, where at least one of the radicals $R^9$ is a hydroxyl, alkoxy or aryloxy radical, and n is an integral number $\leq 100$, and where B1), B2) and C) are each functionalized with one or more α-organosilanes of the general formula $(R^1O)_{3-k}(R^2)_kSi—(CR^3_2)—X$ (I), where $R^1$ is hydrogen, an alkyl radical having 1 to 6 carbon atoms or an aryl radical, $R^2$ and $R^3$ each independently of one another are hydrogen, an alkyl radical having 1 to 12 carbon atoms or an aryl radical, k may denote the values 0, 1 or 2, and X is a radical having 2 to 20 hydrocarbon atoms with an ethylenically unsaturated group.

Suitable vinyl esters are those of carboxylic acids having 1 to 15 C atoms. Preference is given to vinyl acetate, vinyl propionate, vinyl butyrate, vinyl-2-ethylhexanoate, vinyl laurate, 1-methylvinyl acetate, vinyl pivalate and vinyl esters of α-branched monocarboxylic acids having 9 to 11 C atoms, examples being VeoVa9$^R$ and VeoVa10$^R$ (trade names of Resolution). Vinyl acetate is particularly preferred.

Suitable monomers from the group of acrylic esters or methacrylic esters are esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, tert-butyl acrylate, tert-butyl methacrylate, 2-ethylhexyl acrylate and norbornyl acrylate. Particular preference is given to methyl acrylate, methyl methacrylate, n-butyl acrylate, isobutyl acrylate, tert-butyl acrylate, 2-ethylhexyl acrylate, and norbornyl acrylate.

Preferred vinylaromatics are styrene, alpha-methylstyrene, the isomeric vinyltoluenes and vinylxylenes, and divinylbenzenes. Styrene is particularly preferred.

The vinyl halogen compounds include vinyl chloride, vinylidene chloride, and also tetrafluoroethylene, difluoroethylene, hexylperfluoroethylene, 3,3,3-tri-fluoropropene, perfluoropropyl vinyl ether, hexa-fluoropropylene, chlorotrifluoroethylene and vinyl fluoride. Vinyl chloride is particularly preferred. An example of a preferred vinyl ether is methyl vinyl ether.

The preferred olefins are ethene, propene, 1-alkylethenes and polyunsaturated alkenes, and the preferred dienes are 1,3-butadiene and isoprene. Particular preference is given to ethene and 1,3-butadiene.

As monomers A) it is possible if desired to copolymerize one or more ethylenically unsaturated monocarboxylic or dicarboxylic acids, ethylenically unsaturated sulfonic acids or salts thereof, preferably at 0.1% to 5% by weight, based on the total weight of the monomers A). Preferred monocarboxylic or dicarboxylic acids are acrylic acid, methacrylic acid, fumaric acid, and maleic acid. Preferred sulfonic acids are vinylsulfonic acid, and 2-acrylamido-2-methylpropanesulfonic acid. The use of the ethylenically unsaturated monocarboxylic or dicarboxylic acids and/or sulfonic acids results in stabilization of aqueous dispersions or redispersions of polymer powders of the nanoparticulate silicone organocopolymers.

If desired it is additionally possible to copolymerize 0.1% to 5% by weight of auxiliary monomers, based on the total weight of the monomers A). It is preferred to use 0.5% to 2.5% by weight of auxiliary monomers. Examples of auxiliary monomers are ethylenically unsaturated carboxamides and carbonitriles, preferably acrylamide and acrylonitrile; monoesters and diesters of fumaric acid and maleic acid such as the diethyl and diisopropyl esters; and maleic anhydride. Further examples are pre-crosslinking comonomers such as polyethylenically unsaturated comonomers, examples being divinyl adipate, diallyl maleate, allyl methacrylate or triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate. Also suitable are epoxy-functional comonomers such as glycidyl methacrylate and glycidyl acrylate. Mention may also be made of monomers containing hydroxyl or CO groups, examples being hydroxyalkyl methacrylates and acrylates such as hydroxyethyl, hydroxypropyl or hydroxybutyl acrylate or methacrylate and also compounds such as diacetoneacrylamide and acetylacetoxyethyl acrylate or methacrylate.

Particularly preferred monomers A) are one or more monomers from the group of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene and 1,3-butadiene. Particularly preferred monomers A) are also mixtures of vinyl acetate and ethylene; mixtures of vinyl acetate, ethylene and a vinyl ester of α-branched monocarboxylic acids having 9 to 11 C atoms; mixtures of n-butyl acrylate and 2-ethylhexyl acrylate and/or methyl methacrylate; mixtures of styrene and one or more monomers from the group of methyl acrylate, ethyl acrylate, propyl acrylate, n-butyl acrylate and 2-ethylhexyl acrylate; mixtures of vinyl acetate and one or more monomers from the group of methyl acrylate, ethyl acrylate, propyl acrylate, n-butyl acrylate, 2-ethylhexyl acrylate and, if desired, ethylene; and mixtures of 1,3-butadiene and styrene and/or methyl methacrylate. The mixtures may, if desired, additionally include one or more of the abovementioned ethylenically unsaturated monocarboxylic or dicarboxylic acids, ethylenically unsaturated sulfonic acids or salts thereof, or auxiliary monomers.

The monomer selection and/or the selection of the weight fractions of the monomers is made so as to result in general in a glass transition temperature, Tg, of $\leq 60°$ C., preferably $-50°$ C. to $+60°$ C. The glass transition temperature Tg of the polymers can be determined in a known way by means of differential scanning calorimetry (DSC). The Tg values may also be calculated approximately in advance by means of the Fox equation. According to Fox T. G., Bull. Am. Physics Soc. 1, 3, page 123 (1956) it is the case that: $1/Tg=x1/Tg1+x2/Tg2+ \ldots +xn/Tgn$, where xn is the mass fraction (% by weight/100) of the monomer n and Tgn is the glass transition temperature, in kelvins, of the homopolymer of the monomer n. Tg values for homopolymers are listed in Polymer Handbook 2nd Edition, J. Wiley & Sons, New York (1975).

The fraction of the monomers A) is preferably $\geq 50\%$ by weight, more preferably 70% to 92% by weight, based in each case on the total weight of the components A), B) and C) for preparing the nanoparticulate silicone organocopolymers.

Suitable particles P are particles from the group B1) of silicon oxides and metal oxides. The metal oxides are preferably the oxides of the metals aluminum, titanium, zirconium, tantalum, tungsten, hafnium, zinc and tin. Among the silicon oxides, particular preference is given to colloidal silica, pyrogenic or fumed silica, precipitated silica, or silica sols. Among the metal oxides particular preference is given to aluminum oxides such as corundum, mixed oxides of aluminum with other metals and/or silicon, titanium oxides, zirconium oxides and iron oxides.

Preferred particles P from the group of the silicone resins are those composed of at least 30 mol % of Q units, in other words for which p+z in the repeating unit $[R^4_{(p+z)}SiO_{(4-p-z)/2}]$ of the general formula (II) is 0. Particularly preferred silicone resins are those composed only of M and Q units, in other words for which p+z in the repeating unit $[R^4_{(p+z)}SiO_{(4-p-z)/2}]$ of the general formula (II) is only 0 and 3. If the radicals $R^4$ are substituted, then they may additionally contain one or more identical or different heteroatoms selected from O, S, Si, Cl, F, Br, P or N atoms. Also suitable, furthermore, are silicone resins of the kind composed of any desired combination of M units ($R_3SiO$—), D units (—$OSiR_2O$—), T units ($RSiO_3^{3-}$) and Q units ($SiO_4^{4-}$), with the proviso that T units and/or Q units are always present and that their fraction as a proportion of the units of which the silicone resin is composed totals at least 20 mol % and, where only one of these units is present, its fraction is at least 20 mol % in each case.

Silicone resins B2) most preferred are those composed essentially only of M and Q units, the molar ratio of M/Q units ranging from 30/70 to 60/40, and particular preference being given to resins having an M/Q ratio of 35/65 to 45/55. Resins most preferred are, in addition, those composed predominantly of T units, more preferably those composed of >80 mol % of T units, and most preferably those composed of virtually 100 mol % of T units.

m in the general formula (II) preferably adopts values of from 30 to 100, more preferably from 30 to 70, and most preferably from 30 to 50.

The particles P preferably possess an average diameter of 1 to 1000 nm, more preferably 1 to 100 nm, the particle size being determined by transmission electron microscopy of the resulting dispersions or of the films obtainable from the dispersions.

By α-organosilanes are meant those silanes in which the alkoxy-, aryloxy- or OH-substituted silicon atom is connected directly via a methylene bridge to an unsaturated hydrocarbon radical which has one or more ethylenically unsaturated carbon bonds, it also being possible for the hydrogen radicals of the methylene bridge to be replaced by alkyl and/or aryl radicals, and there is a C=C double bond positioned α to the Si atom.

Suitable α-organosilanes of the formula $(R^1O)_{3-k}(R^2)_kSi$—$(CR^3_2)$—$X$ (I) are also those in which the carbon chains of the radicals $R^1$, $R^2$ and $R^3$ are interrupted by non-adjacent oxygen, sulfur or $NR^4$ groups. Preferred radicals $R^1$ and $R^2$ are unsubstituted alkyl groups having 1 to 6 C atoms and preferred radical $R^3$ is hydrogen. The radical X may be linear, branched or cyclic. Besides the double bond there may also be further functional groups present, which are generally inert with respect to an olefinic polymerization, examples being halogen, carboxyl, sulfinato, sulfonato, amino, azido, nitro, epoxy, alcohol, ether, ester, thioether and thioester groups and also aromatic isocyclic and heterocyclic groups.

Preferred examples of X are monounsaturated $C_2$ to $C_{10}$ radicals; maximum preference as radical X is given to the acryloyl and methacryloyl radicals.

Attention is drawn to the fact that suitable components B) also include those which in addition to the functionalization with α-organosilanes are functionalized with γ-organosilanes (silicon atom is joined via a propylene bridge to an unsaturated hydrocarbon radical) or vinylorganosilanes $H_2C=CH$—$SiX_3$ (with X=alkyl or alkoxy radical, in each case independently of one another).

The fraction of component B) is 0.5% to 49.9% by weight, preferably 1% to 30% by weight, more preferably 4% to 20% by weight, based in each case on the total weight of components A), B) and C) for preparing the nanoparticulate silicone organocopolymers.

Examples of preferred linear polydiorganosiloxanes C) are linear monofunctional silicone oils of the general formula $R^9_3SiO$—$[R^8_2SiO_{2/2}]_n$—$SiR^9_3$ (III), in which the radicals $R^8$ are each attached by a carbon atom to the respective silicon atom of the siloxane chain, and one of the two terminal silicon atoms of the siloxane chain has three radicals $R^9$ attached by a carbon atom, and the other terminal silicon atom has two radicals $R^9$ attached via a carbon atom and one radical $R^9$ attached by an oxygen atom, this radical being a hydroxyl, alkoxy or an aryloxy radical which is capable of reaction with an α-organosilane of the general formula $(R^1O)_{3-k}(R^2)_kSi$—$(CR^3_2)$—$X$ (I), as described above.

The α-organosilanes suitable or preferred for the functionalization of the linear polydiorganosiloxanes C) are the same as those listed correspondingly for component B).

In the formula III, n preferably adopts integral values from 1 to 40, more preferably from 1 to 25, and most preferably 1 to 10.

In the formula III, the radical $R^8$ is preferably methyl, phenyl or hydrogen, more preferably methyl. The radicals $R^9$ are preferably selected from the group encompassing methyl, phenyl, hydrogen, methyloxy, phenyloxy and hydroxyl; and more preferably from the group encompassing methyl and methyloxy.

Examples of preferred polydiorganosiloxanes C) functionalized with α-organosilanes are α-methacryl-oyloxymethylpolydimethylsiloxane and α-methacryloyloxy-propylpolydimethylsiloxane with values of n from preferably 1 to 60, more preferably from 1 to 40, most preferably from 1 to 20 (as determined by means of $^1H$ NMR spectroscopy).

The fraction of the polydiorganosiloxanes C) is preferably 0.1% to 10% by weight, more preferably 0.1% to 7% by weight, most preferably 0.1% to 5% by weight, based in each case on the total weight of components A), B) and C) for preparing the nanoparticulate silicone organocopolymers.

In addition to components A), B) and C), the nanoparticulate silicone organocopolymers may further contain up to 30% by weight, based on the total weight of components A), B) and C), of at least one silane of the general formula $(R^5)_{4-j}$—$Si$—$(OR^6)_j$ (IV), where j is 1, 2, 3 or 4, $R^5$ is an organofunctional radical selected from the group of alkoxy radicals and aryloxy radicals, each having up to 12 C atoms, phosphonic monoester radicals, phosphonic diester radicals, phosphonic acid radicals, methacryloyloxy radicals, acryloyloxy radicals, the vinyl radical, mercapto radicals, isocyanato radicals, the isocyanato radical optionally reaction-blocked for protection against chemical reactions, the hydroxyl radical, hydroxyalkyl-radical radicals, epoxy radicals, glycidyloxy radicals, morpholino radicals, piperazino radicals, primary, secondary or tertiary amino radicals having one or more nitrogen atoms, it being possible for the nitrogen atoms to be substituted by hydrogen or by monovalent aromatic, aliphatic or cycloaliphatic hydrocarbon radicals, carboxylic acid radicals, carboxylic anhydride radicals, aldehyde radicals, urethane radicals, and urea radicals, it being possible for the radical $R^5$ to be attached directly to the silicon atom or to be separated therefrom by a carbon chain of 1 to 6 C atoms, and $R^6$ being a monovalent linear or branched aliphatic or cycloaliphatic hydrocarbon radical or a monovalent aromatic hydrocarbon radical having in each case 1 to up to 12 C atoms, or a radical —C(═O)—$R^7$, $R^7$ being a monovalent linear or branched aliphatic or a cycloaliphatic hydrocarbon radical having in each case 1 to 12 C atoms or a monovalent aromatic hydrocarbon radical. The selected silane or, if desired, the selected silanes may be present in non-hydrolyzed form, in hydrolyzed form or in hydrolyzed and partly-condensed or hydrolyzed and condensed form, or in a mixture of these forms.

The average diameter of the particle domains within the nanoparticulate silicone organocopolymers is preferably in the range from 1 nm to 1000 nm, in particular from 1 nm to 500 nm and with very particular preference from 1 nm to 200 nm. The average diameters can be determined by means for example of scanning electron microscopy or transmission electron microscopy of aqueous dispersions or polymer films of the nanoparticulate silicone organocopolymers.

In the case of miniemulsion polymerization, furthermore, it is further possible if desired for hydrophobic additives to be present in amounts of up to 3% by weight (referred to as "co-surfactants" or "hydrophobes"), based on the total weight of components A), B) and C). In the present case it is often possible for silicone particles to take on the function of the "co-surfactant". Further examples of co-surfactants are hexadecane, cetyl alcohol, paraffin, oligomeric cyclosiloxanes, for example, octamethylcyclotetrasiloxane, and also vegetable oils such as rapeseed oil, sunflower oil or olive oil. Additionally suitable are organic or inorganic polymers having a number-average molecular weight of <10,000. Inventively preferred hydrophobes are the silicone particles to be polymerized themselves, and also D3, D4 and D5 rings and hexadecane. Particular preference is given to the silicone particles to be polymerized, to paraffin and to hexadecane.

The copolymers are prepared in a heterophase operation in accordance with the known techniques of suspension, emulsion or miniemulsion polymerization (cf. e.g. Peter A. Lovell, M. S. El-Aasser, "Emulsion Polymerization and Emulsion Polymers" 1997, John Wiley and Sons, Chichester). In one particularly preferred form the reaction is carried out in accordance with the methodology of miniemulsion polymerization. Miniemulsion polymerizations differ in a number of key points, which make them particularly suitable for copolymerizing water-insoluble monomers, from other heterophase polymerizations (cf. e.g. K. Landfester, "Polyreactions in Miniemulsions", Macromol. Rapid. Commun. 2001, 22, 896-936 and M. S. El-Aasser, E. D. Sudol, "Miniemulsions: Overview of Research and Applications" 2004, JCT Research, 1, 20-31).

The reaction temperatures are from 0° C. to 100° C., preferably from 5° C. to 80° C., more preferably from 30° C. to 70° C. The pH of the dispersing medium is between 2 and 9, preferably between 4 and 8. In one particularly preferred embodiment it is between 6.5 and 7.5. The adjustment of the pH before the beginning of the reaction can be made by means of hydrochloric acid or sodium hydroxide solution. The polymerization may be conducted batchwise or continuously, with all or some constituents of the reaction mixture being included in the initial charge, with some constituents of the reaction mixture being included partly in the initial charge and partly metered in subsequently, or by the metering process without an initial charge. All metered additions are made preferably at the rate at which the component in question is consumed.

The polymerization is initiated by means of the customary water-soluble initiators or redox initiator combinations. Examples of initiators are the sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide and azobisisobutyronitrile. The stated initiators are preferably used in amounts of 0.01% to 4.0% by weight, based on the total weight of the monomers. Redox initiator combinations used are the abovementioned initiators in conjunction with a reducing agent. Suitable reducing agents are sulfites and bisulfites with monovalent cations, examples being sodium sulfite, the derivatives of sulfoxylic acid such as zinc or alkali metal formaldehyde-sulfoxylates, an example being sodium hydroxymethanesulfinate, and ascorbic acid. The amount of reducing agent is preferably 0.15% to 3% by weight of the monomer amount used. In addition it is possible to introduce small amounts of a metal compound which is soluble in the polymerization medium and whose metallic component is redox-active under the polymerization conditions, being based for example on iron or on vanadium. One particularly preferred initiator system comprising the aforementioned components is the system tert-butyl hydroperoxide/sodium hydroxymethanesulfinate/Fe(EDTA)$^{2+/3+}$.

In the case of the reaction regime in accordance with the miniemulsion polymerization methodology it is also possible to use predominantly oil-soluble initiators, such as cumene hydroperoxide, isopropylbenzene monohydroperoxide, dibenzoyl peroxide or azobisiso-butyronitrile. Preferred initiators for miniemulsion polymerizations are potassium persulfate, ammonium persulfate, azobisisobutyronitrile and dibenzoyl peroxide.

To produce water-redispersible polymer powders from the nanoparticulate silicone organocopolymers, the aqueous dispersions of the nanoparticulate silicone organocopolymers are dried in a manner known to one skilled in the art, preferably by the spray drying method.

The invention further provides coating compositions comprising one or more nanoparticulate silicone organocopolymers of the invention and also, if desired, one or more auxiliaries and, if desired, one or more additives.

Examples of auxiliaries are surfactants, with suitability being possessed not only by anionic surfactants but also nonionic surfactants, or cationic surfactants, or ampholytic surfactants. Other auxiliaries also include pigments, examples being earthy pigments, such as chalk, ocker, umber, green earth, mineral pigments, such as titanium dioxide, chromium yellow, red lead oxide, zinc yellow, zinc green, cadmium red, cobalt blue, organic pigments, such as sepia, Cassel brown, indigo, azo pigments, anthraquinonoid pigments, indigoid pigments, dioxazine pigments, quinacridone pigments, phthalocyanine pigments, isoindolinone pigments and alkali blue pigments.

Additives are, for example, biocides, thickeners, alkyl orthotitanates, alkylboric esters, pigment-wetting agents and dispersants, antifoams, anticorrosion pigments, metal oxides, metal carbonates or organic resins.

The coating compositions comprise preferably 1% to 90%, more preferably 4% to 70%, by weight of the nanoparticulate silicone organocopolymer dispersions; preferably 0.1% to 10%, more preferably 0.5% to 5%, by weight of surfactants; preferably 0.5% to 40%, more preferably 2% to 35%, most preferably 5% to 30%, by weight of pigments; preferably 0.1% to 60%, more preferably 1% to 50%, most preferably 10% to 40%, by weight of additives; and preferably 10% to 70%, more preferably 15% to 65%, most preferably 20% to 60%, by weight of water. These fractions in % by weight are based in each case on the total weight of the coating composition in question.

For the preparation of the coating compositions it is possible for their individual components to be mixed in any desired way in the apparatus customary for the purpose. Preferably, the nanoparticulate silicone organocopolymers are added in the form of powders to the millbase, in the manner typical for silicone resin binders, or are added to the coating composition in the form of dispersions during application.

The coating compositions are used preferably as paints, for example for interior or, preferably, exterior building application, or else as coating compositions for verandas or terraces.

The coating compositions can also be used, however, for coating uninstalled building materials, such as bricks, lime sandstone blocks or concrete blocks.

Paints comprising the coating compositions of the invention may be given supercritical or subcritical formulations. Preference is given to a supercritical formulation—that is, to paints having a pigment volume concentration (PVC) of >60%. The definition of pigment volume concentration is known to one skilled in the art, for example from Ullmans Enzyklopädie der technischen Chemie, 4th edition, volume 15, page 668.

Further provided by the invention are thermal insulation composite systems (TICS) comprising insulating material and one or more coatings, characterized in that at least one of the coatings has been produced using a coating composition comprising one or more nanoparticulate silicone organocopolymers of the invention.

Examples of suitable insulating materials include inorganic materials, such as mineral wool, examples being rock wool or glass wool, mineral foam, such as calcium silicate hydrates, organic or synthetic materials, such as rigid polystyrene foam (PS), polystyrene particle foam (EPS), polystyrene extruder foam (XPS), rigid polyurethane foam (PUR), vacuum insulating boards (VIB), or else natural materials, such as wood fiber, cork, hemp or reed.

The coatings may comprise one or more plaster coats, such as, for example, an undercoat plaster, possibly comprising a woven fabric, and also, where appropriate, a finish plaster. The plaster coats are preferably mortar-based.

The TICS may be produced by standard methods and may be applied to all customary substrates. Typically the insulating material is applied in the form of boards or sheets with the aid of adhesives, screws or dowels to the substrate in question. Common substrates are of mineral nature, metals, plastics or natural materials, such as wood or wood-plastic composites. Preferred substrates are brick, lime sandstone or concrete. One or more plaster coats may be applied to the insulating material. The coating composition comprising one or more nanoparticulate silicone organocopolymers of the invention is applied preferably as the topmost coat to the TICS. In this case the coating composition of the invention is with particular preference a paint.

The TICS of the invention are suitable in particular for external building surfaces, more preferably for external walls of buildings.

Advantageously, the coating compositions of the invention produce porous, vapor-permeable coatings which have surfaces or capillaries on or in which water splits and does not run off as beads, the coatings being sufficiently hydrophobic to prevent penetration of liquid water from outside into the coatings or the TICS.

Besides the uses identified above, the silicone organocopolymers of the invention may also be used for preparing coating materials or impregnating systems and resultant coatings and coverings on substrates, such as metal, glass, wood, mineral substrate, synthetic fibers and natural fibers for producing textiles, carpets, floor coverings, or other goods which can be produced from fibers, leather, plastics such as films, and moldings. The silicone organocopolymers of the invention, in liquid form or in cured solid form, may be incorporated into elastomer compounds. In that case they may serve for reinforcement or for enhancement of other service properties, such as the control of transparency, heat resistance, yellowing tendency and/or weathering stability. For the stated purposes the silicone organocopolymers may also be used as the pure substance, i.e., without other additions.

The nanoparticulate silicone organocopolymers possess high stabilities on storage. To coatings they impart excellent resistance, for example, to weathering effects, to chemical attack and to UV radiation. With these coatings it is also possible to realize very good water resistance and a low soiling tendency. By virtue of the copolymerization into the silicone organocopolymer of silanes containing hydrolyzable and condensable groups, coating compositions can be prepared which are moisture-curing after application, thereby allowing adjustment of the film hardnesses, the thermoplasticity and the soiling tendency.

EXAMPLES

All figures are understood to be at room temperature and under atmospheric pressure, unless noted otherwise.
Preparation of a Particle with Methacrylic Functionality
Particle 1:

A solution of 100 parts by weight (pbw) of a particulate organopolysiloxane resin (39% M units; 61% Q units; $R^4$ as per formula II: methyl) and 5 pbw of the α-silane methacrylatomethyl-methyldimethoxysilane in toluene was reacted in the presence of 3 pbw of the acidic catalyst Tonsil® Optimum FF (acidic phyllosilicate; trade name of Süd-Chemie). Following removal of the catalyst by filtration, the solvent was evaporated off.
Preparation of the Nanoparticulate Silicone Organocopolymers

Example 1

Polymer 1

A 100 liter reaction vessel with jacket cooling, evaporated cooling and anchor stirrer was charged with 6560 g of water and with one gram of an Fe(II)-EDTA complex. The apparatus was rendered inert by twice evacuating and breaking of the vacuum with nitrogen.

In a second vessel, methacrylic acid, water and sodium dodecyl sulfate were dissolved (water phase), in the quantities indicated below as feed 1.

In a third vessel, the remaining components of feed 1 were dissolved homogeneously in the quantities indicated (oil phase).

The oil phase was then introduced with thorough stirring into the vessel containing the water phase. The resulting crude emulsion was homogenized using a high-pressure homogenizer from IKA at a pressure of 800 bar in one pass. This gave a preliminary emulsion containing all of the components of feed 1. This preliminary emulsion was stirred at room temperature in a stirring vessel (preliminary emulsion vessel). Feed 2 and feed 3, each from a separate vessel, were introduced in the quantities indicated below.

Feed 1 (All Figures in Grams):

| Hexadecane | 131.2 |
|---|---|
| Butyl acrylate | 7216 |
| Methyl methacrylate(MMA) | 6560 |
| Butyl methacrylate | 2296 |
| Styrene | 1312 |
| Methacrylic acid | 360.8 |
| Sodium dodecyl sulfate | 492 |
| Linear, monomethacrylatomethyl-functional PDMS (number-average molar mass: 1200 g/mol) | 918.4 |
| Particle 1 | 918.4 |
| Distilled water | 9840 |

Feed 2 (All Figures in Grams):

| Water | 1417 |
|---|---|
| tert-Butyl hydroperoxide | 157.4 |

Feed 3 (All Figures in Grams):

| Water | 1496 |
|---|---|
| Brüggolit ® | 78.7 |

The reaction vessel charged with water was heated to 50° C. The reaction was commenced by simultaneous starting of feeds 1 to 3. Feed 1 was metered into the reaction vessel over a period of three hours, while feeds 2 and 3 were metered over a period of 200 minutes. During these additions, the reaction mixture was held, by jacket cooling of the reaction vessel, at a temperature of 50° C. Following complete addition of the individual feeds, stirring was continued for 30 minutes more. The pH of the dispersion was then brought from about 3 to a pH of 8.0, using a 10% by weight aqueous ammonia solution.

After the resulting dispersion had been filtered through a screen stocking having a mesh size of 50 micrometers, a dispersion was obtained with a solids content of 50% at a volume-average particle size of 90 nm.

Example 2

Polymer 2

Polymer 2 was prepared in the same way as for example 1, with the difference that the composition of feed 1 is as follows:

Feed 1 (All Figures in Grams):

| Hexadecane | 131.2 |
|---|---|
| Butyl acrylate | 7216 |
| MMA | 7872 |
| Butyl methacrylate | 2296 |
| Methacrylic acid | 360.8 |
| Sodium dodecyl sulfate | 492 |
| Linear, monomethacrylatomethyl-functional PDMS (number-average molar mass: 1200 g/mol) | 918.4 |
| Particle 1 | 918.4 |
| Distilled water | 9840 |

Polymer 3

Polymer 3 was prepared in the same way as for example 1, with the difference that the composition of feed 1 is as follows:

Feed 1 (All Figures in Grams):

| Hexadecane | 131.2 |
|---|---|
| Butyl acrylate | 7216 |
| MMA | 6560 |
| Butyl methacrylate | 2296 |
| Styrene | 1312 |
| Methacrylic acid | 360.8 |
| Sodium dodecyl sulfate | 492 |
| Particle 1 | 1837 |
| Distilled water | 9840 |

Polymer 4

Polymer 4 was prepared in the same way as for example 1, with the difference that the composition of feed 1 is as follows:

Feed 1 (All Figures in Grams):

| Hexadecane | 131.2 |
|---|---|
| Butyl acrylate | 7216 |
| MMA | 6560 |
| Butyl methacrylate | 2296 |
| Styrene | 1312 |
| Methacrylic acid | 360.8 |
| Sodium dodecyl sulfate | 492 |
| Linear, monomethacryloyl-functional PDMS with number-average molar mass of approximately 1200 g/mol | 1837 |
| Distilled water | 9840 |

All of the polymers were obtained in the form of dispersions with solids contents SC of approximately 50% by weight, volume-average particle sizes of approximately 90 nm and pH values of 8.0.

Preparation of the Coating Compositions:

Each coating composition was prepared by successively adding the components listed in table 1, in accordance with the numbering, and mixing them thoroughly using a customary, high-speed stirrer mechanism (Dissolver from Getzmann).

TABLE 1

Formula for the coating compositions:

| No. | Raw materials | pbw | Function | Manufacturer |
|---|---|---|---|---|
| 1 | Water | 146.5 | | |
| 2 | Lopon 890 | 1.0 | Dispersant | BK Giulini Chemie |
| 3 | Calgon N | 1.0 | Wetting agent/dispersant | BK Giulini Chemie |
| 4 | Acticide MBS | 1.0 | In-can preservative | Thor-Chemie |
| 5 | Acticide MKA | 5.0 | Film preservative | Thor-Chemie |
| 6 | Walocell XM 20000 PV | 1.5 | Thickener | Wolff Walsrode |
| 7 | SILFOAM SD 860 | 1.5 | Defoamer | Wacker Chemie |
| 8 | Lusolvan FBH | 5.0 | Film-forming assistant | BASF |

TABLE 1-continued

Formula for the coating compositions:

| No. | Raw materials | pbw | Function | Manufacturer |
|---|---|---|---|---|
| 9 | Kronos 2190 | 60.0 | White pigment | Kronos Titan |
| 10 | Omyacarb 5 GU | 107.5 | Nodular filler | Omya |
| 11 | Plastorit 000 | 40.0 | Nodular filler | Luzenac |
| 12 | Steopac | 20.0 | Lamellar filler | Luzenac |
| 13 | OpTiMat 2550 | 6.0 | Matting filler | World Minerals |
| 14 | Optional polymer | 100.0 | Binder | |
| 15 | Sodium hydroxide, 10% strength | 0.5 | pH adjustment | |
| 16 | Tafigel PUR 40 | 1.0 | Rheology additive | Münzing-Chemie |

Performance Testing of the Coating Compositions

In the (comparative) examples ((C) ex.) below, all figures for parts by weight (pbw) and percentages by weight (% by weight) are based on the total weight of the respective composition, unless otherwise indicated.

Each of the test specimens was produced in accordance with DIN EN 1062-3, by using a brush to apply each coating composition (table 1) in a thickness of 200 g/m² to lime sandstone and drying the lime sandstone thus coated at room temperature for 1 week, followed by storage for 24 hours under standard conditions (23° C.±2° C., 50%±5% relative humidity).

The water permeability of each of the test specimens was effected in accordance with DIN EN 1062-3 (Determination of water permeability of coatings, February 1999). The uncoated lime sandstone had a water absorption coefficient after 24 hours of water storage, $w_{24}$, of 6.19 kg/(m²h$^{0.5}$). The values obtained in this way for the water permeability are listed in table 2.

The water vapor permeability was determined in accordance with ISO 7783-2 on each test specimen (see table 2).

The water absorption by the respective test specimen was determined in accordance with DIN EN 1062-3, with the difference that the test specimen, instead of being stored 3 times for 24 hours each time in fresh mains water with drying thereafter was stored continuously in water for 72 hours and then dried for 24 hours at 50° C.±5° C. The water absorption values obtained in this way are listed in table 2.

The surface hydrophobicity was evaluated by determination of the beading effect (table 2). For this purpose, a drop of water was applied to the respective, horizontally stored test specimen. Observation took place to determine whether this drop of water runs off as a bead, remains standing on the surface, spreads or penetrates.

The beading effect was evaluated on the basis of a school-grade system, with the following assessment criteria:
1=very good beading effect—substrate is not wetted, water runs off completely as a bead, no remaining drop
2=good beading effect—individual drops of water remain, no spreading of water
3=moderate beading effect—substrate partly wetted
4=poor beading effect—substrate wetted
5=no beading effect—substrate is wetted and darkens due to absorbed water.

For the determination of the transparency, an aqueous dispersion of the respective polymer with a solids content SC of 50% by weight was prepared. The respective dispersion was drawn into a film, using a four-way coating bar with a slot width of 100 micrometers, and was dried at room temperature for 24 hours. Subsequently, along the lines of DIN 50014, the film was evaluated by inspection on the basis of a scale from 1 to 10, where 1 corresponds to an entirely transparent film and 10 to a nontransparent film.

TABLE 2

Results of the testing of the coating compositions with the composition corresponding to table 1:

| | Polymer | Water absorption [kg/(m²h$^{0.5}$)] | Water vapor permeability [m] | Beading effect | Transparency |
|---|---|---|---|---|---|
| C* ex. 3 | — | 6.19 | — | 5 | — |
| Ex. 4 | Polymer 1 | 0.11 | 0.10 | 4-5 | 3 |
| Ex. 5 | Polymer 2 | 0.11 | 0.10 | 4-5 | 3 |
| C ex. 6 | Polymer 3 | 0.09 | 0.16 | 3 | 6 |
| C ex. 7 | Polymer 4 | 0.25 | 0.10 | 2 | 7 |
| C ex. 8 | Silicone resin paint[a] | 0.10 | 0.05 | 1 | — |

*C = Comparative Example
[a] The composition of the silicone resin paint was as in table 1, the binder being a silicone resin emulsion of a methylsilicone resin (molecular weight Mw of 6000 g/mol; all hydrocarbon radicals attached directly to the silicon are methyl radicals; the methylsilicone resin carries 0.4% hydroxyl and 3.7% ethoxy groups, based on the total mass of the particle) and a silicone-containing early hydrophobicity additive (aqueous emulsion (SC = 55%) of a condensation product of α,ω-bishydroxy-polydimethylsiloxanes and N-(2-aminoethyl)-3-aminopropyltrimethoxysilane in the presence of KOH. The silicone-containing early hydrophobicity additive has an amine number of approximately 0.3, a viscosity of approximately 1500 mm²/s at 25° C., and a residual methoxy content of less than 5 mol %, based on the methoxy groups present initially in the N-(2-aminoethyl)-3-aminopropyltrimethoxysilane.) and also contained FLEXCRYL SAF 34 (dispersion-based binder) from Wacker Polymer Systems.

The coating comprising a standard silicone resin paint (table 2: comparative example 8) has a very low water vapor permeability and a low water absorption value, and exhibits a strongly pronounced beading effect, which, when the coating is employed accordingly in exterior facades, results in the problems described at the outset. The coatings of comparative examples 6 and 7 (polymers 3 and 4) also display a pronounced beading effect. Only the inventive examples 4 and 5, comprising the silicone organocopolymers of the invention, exhibit good water absorption and water vapor permeability and at the same time have a surface hydrophilicity such that a drop of water spread on the surface and does not run off as a bead. Moreover, the inventive silicone organocopolymers (polymers 1 and 2) are more transparent than the polymers 3 and 4 used in comparative examples 6 and 7, respectively.

The invention claimed is:

1. Nanoparticulate silicone organocopolymers in the form of an aqueous polymer dispersion or water-redispersible polymer powder, prepared by a process comprising free-radical initiated polymerization in an aqueous medium to form an aqueous polymer dispersion and optionally, subsequent drying of the resultant polymer dispersion, of
  A) one or more first monomers selected from the group consisting of vinyl esters, (meth)acrylic esters, vinylaromatics, olefins, 1,3-dienes, vinyl ethers and vinyl halides and optionally copolymerizing further monomers copolymerizable with said first monomers, in the presence of
  B) at least one particle P having an average diameter of ≦1000 nm, which is functionalized with ethylenically unsaturated, free-radically polymerizable groups, where
    B1) the particles P comprise one or more particles selected from the group of metal oxides and semimetal oxides, and/or
    B2) the particles P comprise silicone resins of the formula $[R^4_{(p+z)}SiO_{(4-p-z)/2}]_m$ (II), the individual radicals $R^4$ each independently of one another being hydrogen, hydroxyl, alkyl, cycloalkyl, aryl, alkoxy or aryloxy radicals having up to 18 C atoms, which may optionally be substituted, m is an integral number $\geq 30$, and where, for at least 20 mol % of the respective silicone resin, p+z=0, 1 or 3, and C) one or more linear polydiorganosiloxanes of the formula $R^9_3SiO—[R^8_2SiO_{2/2}]_n—SiR^9_3$ (III), where the individual radicals $R^8$ and $R^9$ each independently of one another are hydroxyl, alkyl, cycloalkyl, aryl, alkoxy or aryloxy radicals having up to 18 C atoms, which may optionally be substituted, and where at least one of the radicals $R^9$ is a hydroxyl, alkoxy or aryloxy radical, and n is an integral number $\leq 100$, and where B1), B2) and C) are each functionalized with one or more α-organosilanes of the general formula $(R^1O)_{3-k}(R^2)_kSi—(CR^3_2)—X$ (I), where $R^1$ is hydrogen, an alkyl radical having 1 to 6 carbon atoms or an aryl radical, $R^2$ and $R^3$ each independently of one another are hydrogen, an alkyl radical having 1 to 12 carbon atoms or an aryl radical, k is 0, 1 or 2, and X is a radical having 2 to 20 hydrocarbon atoms with an ethylenically unsaturated group.

2. The nanoparticulate silicone organocopolymers of claim 1, wherein the radicals $R^8$ of the linear polydiorganosiloxanes C) are methyl, phenyl or hydrogen.

3. The nanoparticulate silicone organocopolymers of claim 1, wherein the radicals $R^9$ of the linear polydiorganosiloxanes C) are selected from the group consisting of methyl, phenyl, hydrogen, methyloxy, phenyloxy, and hydroxyl.

4. The nanoparticulate silicone organocopolymers of claim 2, wherein the radicals $R^9$ of the linear polydiorganosiloxanes C) are selected from the group consisting of methyl, phenyl, hydrogen, methyloxy, phenyloxy, and hydroxyl.

5. The nanoparticulate silicone organocopolymers of claim 1, wherein at least one of particles P are B1) silicon oxides or oxides of the metals aluminum, titanium, zirconium, tantalum, tungsten, hafnium, zinc and tin.

6. The nanoparticulate silicone organocopolymers of claim 1, wherein particles P are B2) silicone resins of the formula $[R^4_{(p+z)}SiO_{(4-p-z)/2}]_m$ (II), which contain any combination of M units ($R_3SiO—$), D units ($—OSiR_2O—$), T units ($RSiO_3^{3-}$) and Q units ($SiO_4^{4-}$), with the proviso that T units and/or Q units are always present and that their fraction as a proportion of the units of which the silicone resin is composed totals at least 20 mol % and, where when only one of T or Q units is present, its fraction is at least 20 mol %.

7. The nanoparticulate silicone organocopolymers of claim 1, wherein the α-organosilane of the formula $(R^1O)_{3-k}(R^2)_kSi—(CR^3_2)—X$ (I) contains unsubstituted alkyl groups having 1 to 6 C atoms as radicals $R^1$ and $R^2$ and hydrogen as radical $R^3$ and monounsaturated $C_2$ to $C_{10}$ radicals as radical X.

8. The nanoparticulate silicone organocopolymers of claim 1, wherein the average diameter of the particle domains of the nanoparticulate silicone organocopolymers is 1 nm to 1000 nm.

9. A process for preparing nanoparticulate silicone organocopolymers of claim 1, comprising suspension polymerizing, emulsion polymerizing or miniemulsion polymerizing.

10. A coating composition comprising one or more nanoparticulate silicone organocopolymers of claim 1, and optionally, one or more auxiliaries or additives.

11. The coating composition of claim 10 which is a paint.

12. In a thermal insulation composite system (TICS) comprising insulating material and one or more coatings, the improvement comprising producing at least one of the coatings using a coating composition comprising one or more nanoparticulate silicone organocopolymers of claim 1.

13. In a process for preparing coating materials and impregnating systems and for producing textiles, carpets, floor coverings, or other goods which can be produced from fibers, leather, or plastics, the improvement comprising using nanoparticulate silicone organocopolymers of claim 1.

14. An elastomer composition comprising at least one nanoparticulate silicone organo copolymer of claim 1.

* * * * *